(12) United States Patent
Boom et al.

(10) Patent No.: US 8,573,600 B2
(45) Date of Patent: Nov. 5, 2013

(54) HIGH-VACUUM SEAL

(75) Inventors: Stephanus Hubertus Leonardus van den Boom, Geldrop (NL); Roland Wilhelmus Pieter Jonkers, Someren (NL); Henricus Fransiscus Maria van den Boom, Nuenen (NL); Rients Jan de Groot, Heeze (NL); Pieter Hendrik Trudo Johannes Uland, Eindhoven (NL)

(73) Assignee: FEI Company, Hillsboro, OR (US)

( * ) Notice: Subject to any disclaimer, the term of this patent is extended or adjusted under 35 U.S.C. 154(b) by 393 days.

(21) Appl. No.: 12/876,719

(22) Filed: Sep. 7, 2010

(65) Prior Publication Data

US 2011/0057393 A1    Mar. 10, 2011

(30) Foreign Application Priority Data

Sep. 7, 2009    (EP) .................................... 09169562

(51) Int. Cl.
*F16J 15/40*    (2006.01)
(52) U.S. Cl.
USPC .......................................... 277/431; 277/913
(58) Field of Classification Search
USPC ........................ 277/431–432, 505, 579, 913
See application file for complete search history.

(56) References Cited

U.S. PATENT DOCUMENTS

| 3,058,232 | A |   | 10/1962 | Farkass |   |
|---|---|---|---|---|---|
| 3,144,035 | A |   | 8/1964 | Hablanian et al. |   |
| 4,256,314 | A | * | 3/1981 | Berglund et al. | ............. 277/587 |
| 5,103,102 | A |   | 4/1992 | Economou et al. |   |
| 5,516,122 | A |   | 5/1996 | Caffee |   |
| 5,538,262 | A |   | 7/1996 | Matsumura |   |
| 5,607,165 | A | * | 3/1997 | Bredemeyer | .................. 277/320 |
| 5,660,396 | A | * | 8/1997 | Schouten | ....................... 277/500 |
| 6,161,834 | A | * | 12/2000 | Pollack et al. | ................. 277/300 |
| 6,923,792 | B2 | * | 8/2005 | Staid et al. | ..................... 604/249 |
| 6,962,348 | B2 |   | 11/2005 | Fink |   |
| 7,518,121 | B2 |   | 4/2009 | Maas et al. |   |
| 2009/0200489 | A1 |   | 8/2009 | Tappel et al. |   |

FOREIGN PATENT DOCUMENTS

| WO | 2007143734 | 12/2007 |
|---|---|---|
| WO | 2007143736 | 12/2007 |
| WO | 2007143737 | 12/2007 |
| WO | 2007145712 | 12/2007 |

OTHER PUBLICATIONS

Danielson, Phil, "Fight Humidity In Your Vacuum System," R&D, Jun. 1, 2001, 3 pgs.
Yoshimura, Nagamitsu, Vacuum Technology: Practice for Scientific Research, Jan. 28, 2008, pp. 148-1555, Springer.

* cited by examiner

*Primary Examiner* — Vishal Patel
(74) *Attorney, Agent, or Firm* — Scheinberg & Associates, PC; Michael O. Scheinberg

(57) ABSTRACT

The invention relates to an improved O-ring seal for use as a high vacuum seal. A limitation of standard O-ring seals is the permeation of water through the O-ring. Especially for instruments in which parts are kept at a cryogenic temperature, such as a cryogenic electron microscope, the presence of water in the vacuum is a problem, as this results in ice growth on the cryogenic parts. As a solution often a double O-ring seal is used, or a metal seal. Both of these solutions have severe draw-backs.
The invention proposes to place the O-ring in a channel in which dry gas, such as dry nitrogen, is blown. In this way no water can permeate through the O-ring, resulting in a reduced base pressure and highly reduced ice growth.

6 Claims, 3 Drawing Sheets

HIGH-VACUUM SEAL

The invention relates to a method of using a seal assembly for forming a high-vacuum seal, the seal assembly comprising:
- a first part and a second part to be sealingly connected,
- an O-ring in a chamber between the first and the second part, the O-ring sealing the first and the second part, and
- means to reduce the permeation of water through the O-ring.

The invention further relates to high-vacuum seals equipped for performing the method according to the invention, and instruments comprising such seals.

In many instruments a high-vacuum seal must be made to form a high-vacuum seal between two parts of the instrument. Such instruments include, but are not limited to, electron microscopes, ion microscopes, mass spectrometers, sputter units, and Chemical Vapour Deposition (CVD) units.

In this context high-vacuum is to be understood as a pressure between $1\times10^{-3}$ to $1\times10^{-9}$ mbar ($1\times10^{-1}$ to $1\times10^{-7}$ Pa).

In "Vacuum Technology, Practice for Scientific Instruments", Yoshimura, N., 2008, ISBN: 978-3-540-74432-0, at page 148 it is mentioned that (per)fluoroelastomer O-rings are used as seals in the high-vacuum system of an electron microscope. Water vapour molecules from the atmosphere permeate through the elastomer O-rings, and as a result, water molecules become the main residual gas in high vacuum systems using elastomer seals.
This book then proceeds at page 150 to mention that a solution to this problem was formulated in 1967 by L. de Csernatony and D. J. Crawley. The solution involves the use of 2 concentric O-rings, the volume between the O-rings (further referred to as the intermediate volume) evacuated to a pressure of, for example, 10 mbar. As the gas between the O-rings is pumped away, water is pumped away with it, resulting in a lower partial water pressure of the remaining gas. Due to the lower partial water pressure in the intermediate volume less water permeates through the O-ring to the high vacuum.

A disadvantage of this so-named double O-ring solution is that for each seal two O-rings are used, each in its own chamber, and that the evacuation of the intermediate vacuum implies vacuum tubing, a vacuum pump and control equipment. This all adds considerably to the costs of the seal.
It is noted that for the tubing that connects the intermediate vacuum to the pump, tubing must be chosen that can withstand a pressure difference of approximately 1 atmosphere from the outside to the inside without collapse of the tube. Also the inner diameter should be sufficient for a reasonable pumping speed at these pressures. These two demands result in a rather thick, and expensive, tube.

In "Fight Humidity in your vacuum system", P. Danielson, R&D Magazine, June 2001, p. 67, this same solution is described:
"All air gases permeate Viton, but water vapor is the only one that presents a normal variation on the air side of a seal. The humidity becomes a problem when we consider that the permeation rate for water vapor from air at 20 [degrees] C. and 50% RH is approximately the same as air. As the humidity increases, usually along with a temperature increase, the predominant permeating gas will be water vapor. Barring the replacement of Viton with metal gaskets, the only way to avoid the permeation of water vapor is to use two concentric O-rings with an evacuated channel between them so that the channel can act as a "guard vacuum." A pressure of about 10 torr is usually adequate for this pressure to totally stop any permeation."

From this it can be concluded that in 2001 the double O-ring solution was still "state of the art".

It is noted that for high-vacuum and ultra-high vacuum seals often metal seals are used. A typical metal seal is e.g. the so-named Conflat® flange (CFF), which shows two circular knife edges, which compress a copper gasket. The copper gasket may be annealed to lower the pressure/force necessary for elastic deformation of the gasket. As copper shows a low leak rate and permeation, a pressure of $1\times10^{-12}$ mbar range can be achieved. Disadvantages of the CFF are the high pressures necessary to compress the copper ring, necessitating a construction with high stiffness, necessitating thick flanges of high quality steel, such as stainless steel, and many bolts that must be closed with well defined torques. This results in an expensive seal. Also, the time for breaking and making the seal (for e.g. servicing) is considerable. Also, the gaskets can be used only once, resulting in high costs of disposables.

U.S. Pat. No. 5,516,122 another solution is described, using highly polished grooves in which an O-ring is placed, the groove almost entirely encapsulating the O-ring. The effect of the polishing, according to the inventor of said patent, is that there is less leakage around the O-ring and less permeation through the O-ring. The inventor claims a thousand fold reduction in attainable pressure.

Applicant was not able to reproduce these figures. As a probable cause applicant suggests that, although the length of the channels through which permeation occurs is longer in said invention, this only results in a longer time for the molecules permeating through the channels travelling through the O-ring, and not in a reduction of the number emerging from a channel. The number of channels is reduced due to the reduced area of the O-ring exposed to air/vacuum, but this is insufficient for the thousand fold reduction.

Applicant found difficulties in placing the O-ring: the O-ring was often damaged by pinching between the flanges according to the patent, resulting in large leakage. It is noted that, even if this would be a solution, the costs of the improved grooves is large.

Obviously there is a long-felt need for a simple, reliable and cheap seal showing a low permeability for water.

The invention intends to provide a seal assembly showing comparable permeability for water as a double O-ring seal at reduced costs.

To that end the invention is characterized in that the means to reduce the permeation of water through the O-ring take the form of exposing the part of the O-ring that, in working, is not exposed to vacuum or pressed against the first or second parts, to dry gas.

The invention is based on the insight that for the permeability of water the vapour pressure of water needs to be reduced. This can be achieved by lowering the total pressure of all gasses together with that of water (as done in the double O-ring seal), but can also be achieved by lowering the humidity of the gas at more or less constant total pressure. Lowering the humidity is done by exposing the O-ring to a dry gas, such as dry air or nitrogen. To expose the O-ring to a dry gas, dry gas can be supplied to the O-ring by directing the dry gas with a slight overpressure to the O-ring, whereby the dry gas displaces the normally present, moist, air. Supplying the gas is preferably done via tubing. As the gas in this tubing shows a slightly higher pressure at its inside than at its outside, no risk of collapse of the tube exists, as is the case for the vacuum tubing needed in the double O-ring solution. Also, as the pressure is close to atmospheric pressure, and the gas flow needed is small, the diameter of the tubing may be small. Both the small diameter (due to the low flow) and the small overpressure result in tubes that are considerably cheaper than those used in the double O-ring concept. Example of the materials that can be used for such tubes are, for example, a copolymer of hexafluoropropylene and tetrafluoroethylene (FEP), polyurethane (PU), polyethylene (PE), polyamide (PA) and polytetrafluoroethylene (PTFE).

In an embodiment of the method according to the invention the O-ring is a polymer.

Such polymers are used for the standard medium-vacuum O-rings. Examples are, for example, fluoroelastomers, such as Viton®, and perfluoroelastomers, such a Kalrez®. The choice of the material depends on, for example, temperature range, resistance to chemicals, resistance to photons such as ultraviolet and x-ray, etc.

In another embodiment of the method according to the invention the water contents of the dry gas is less than 0.1 $g/m^3$.

The water contents of air as a function of temperatures and relative humidity is shown in table 1.

TABLE 1 absolute humidity of water in air [$g/m^3$] as a function of temperature and relative humidity.

| | | Relative humidity [%] | | | | | | | | |
|---|---|---|---|---|---|---|---|---|---|---|
| | | 10% | 20% | 30% | 40% | 50% | 60% | 70% | 80% | 90% | 100% |
| Air temperature [° C.] | +30 | 3.0 | 6.1 | 9.1 | 12.1 | 15.2 | 18.2 | 21.3 | 24.3 | 27.3 | 30.4 |
| | +25 | 2.3 | 4.6 | 6.9 | 9.2 | 11.5 | 13.8 | 16.1 | 18.4 | 20.7 | 23.0 |
| | +20 | 1.7 | 3.5 | 5.2 | 6.9 | 8.7 | 10.4 | 12.1 | 13.8 | 15.6 | 17.3 |

Assuming a standard environment of approximately 20° C. and 50% relative humidity, the absolute humidity is close to 10 $g/m^3$. By using dry gas with a water content a hundred time lower than that of normal air, the permeation of water is also lowered a hundred times. This hundred fold reduction is comparable to a double O-ring seal in which the pressure of the intermediate volume is 10 mbar (approximately 1/100 of atmospheric pressure), assuming that the relative water contents of the gas in the intermediate vacuum is the same as that of the surrounding air.

It is noted that often the relative water contents of a volume at such reduced pressure is higher than that of atmospheric air. In another embodiment of the method according to the invention the dry gas is dry nitrogen. Nitrogen with low water contents is widely available as an industrial gas. It can be supplied as a pressurized gas (in bottles), or it can be formed by boiling of liquid nitrogen.

It is noted that many instruments using high-vacuum use nitrogen for purging and venting, and thereby there is good accessibility of dry nitrogen in such instruments. The use of nitrogen will in itself thus not lead to increased costs.

In another embodiment of the method according to the invention the dry gas is brought in contact with the O-ring via a channel surrounding the O-ring, the channel formed in at least one of the parts, the channel showing an inlet and an outlet.

By surrounding the O-ring with a channel in which the dry gas is blown, the O-ring is completely surrounded by dry gas.

In a further embodiment of the method according to the invention there is a continuous flow of the dry gas in the channel.

To eliminate any residual water in the channel, a flow of dry air is used to expel said residual water. Said flow can be a non-continuous flow, but a continuous flow may be preferred to eliminate e.g. vibrations introduced by for example pulsing of the pressure in the channel or the tubing.

It is noted to reduce vibrations it may be necessary to limit the continuous gas flow to a flow below a critical value.

In an aspect of the invention a seal assembly, the seal assembly comprising: a first part and a second part to be sealingly connected, an O-ring fitted in a chamber between the first and the second part, the O-ring sealing the first and the second part, is characterized in that the seal assembly comprises a channel for supplying a dry gas to the O-ring, and an inlet to supply the dry gas to the channel.

In an embodiment of the seal assembly according to the invention the seal further shows an outlet in contact with the channel.

To eliminate any residual water in the channel preferable a flow of dry gas is maintained in the channel. This implies an inlet and a way for the dry gas to be expelled. This can be done by making a leaky connection between the channel and the surrounding air, but preferable an outlet, far removed from the inlet, is used so that the dry gas is forced to flow around the O-ring. The outlet may take the form of a channel from the chamber to the outside, but may also take the form of another nipple, with or without tubing connected to it.

In a further embodiment an apparatus is equipped with a seal assembly according to the invention.

In a yet further embodiment of the apparatus according to the invention the apparatus comprises a multitude of seals assemblies according to the invention, in which the channels are connected in series.

In a yet further embodiment of the apparatus according to the invention a pressure regulator in series with the channel or channels is used to regulate the flow through the channel or channels.

In another embodiment of the apparatus according to the invention the apparatus is a particle-optical apparatus.

In a particle-optical apparatus, such as a Transmission Electron Microscopes (TEM), a Scanning Transmission Electron Microscope (STEM), a Scanning Electron Microscope (SEM), a Focused Ion Beam apparatus (FIB), or a Electron Probe Micro Analyzer (EPMA), a part of the apparatus is often evacuated to a high vacuum. Especially the particle source of such apparatus is often evacuated to said pressure.

In another embodiment of the apparatus according to the invention the apparatus is a cryogenic apparatus.

When using an apparatus in which surfaces are cooled to a cryogenic temperature, water vapour will freeze onto said cryogenic surfaces, resulting in an ice growth on the cooled surfaces. Examples occur in, for example, an electron microscope in which a sample is inspected at liquid nitrogen or liquid helium temperatures. It will be clear that ice growth on the sample interferes with the inspection of the sample. Likewise detectors, such as X-ray detectors, may need to be cooled, giving rise to ice growth on said detectors. This may deteriorate the performance of the detectors.

By using the seal according to the invention, less water will leak into the high vacuum of the system, resulting in a reduced ice growth on the cooled surfaces.

In another embodiment of the apparatus according to the invention the apparatus is enclosed in an enclosure, and the outlets of the channels are fed to the outside of the enclosure so as to avoid suffocation risks.

Some instruments are enclosed in an enclosure. This may be done to reduce the amount of noise produced by the instrument, or it may be done to improve the immunity of the instrument to acoustic noise, the noise giving rise to vibrations. Other reasons for enclosing an instrument may be to reduce thermal drift, etc.

When opening the enclosure, for example for servicing the apparatus or for adjusting a part of the instrument, a suffocation risk may occur due to the seals venting non-breathable gas into the enclosure. To avoid the suffocation risk thereby introduced the outlet of the seal assembly may be let to a sufficiently vented area. As the gas flow needed for the seal assemblies is small, venting to the environment outside the enclosure may be sufficient.

BRIEF DESCRIPTION OF THE DRAWINGS

The invention is now elucidated with reference to figures, in which identical reference numerals denote corresponding elements. Here:

FIG. 1 shows a first part in the form of a flange 101 vacuum tight welded to a tube 100, and a second part in the form of a flange 103 vacuum tight welded to a tube 102. The two parts are bolted onto each other by bolt 104, nut 105 and rings 106 and 107. Flange 101 shows a groove 108 and flange 3 shows a groove 109, the two grooves forming an O-ring chamber in which O-ring 110 is placed. The O-ring forms a seal by contacting groove 108 at surface 111 of the O-ring and by contacting groove 109 at surface 112.

Figure 1:
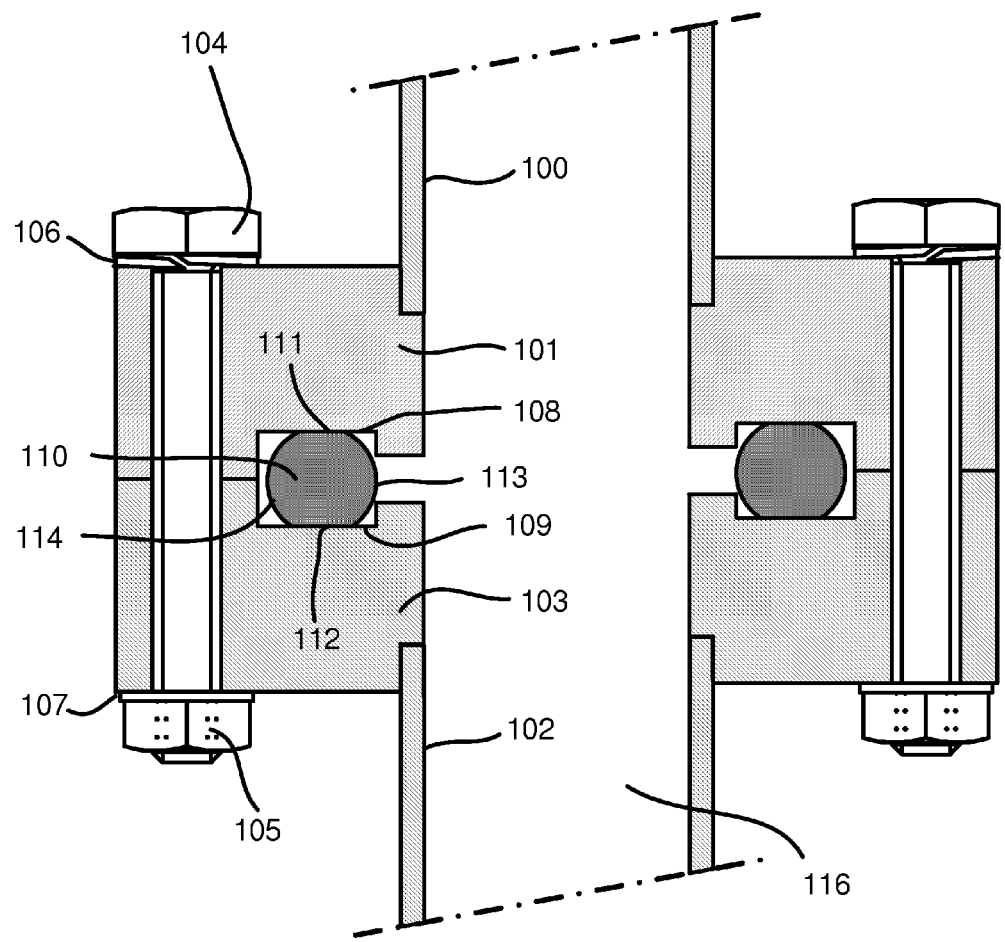
FIG. 1 schematically shows a cross-section of a conventional O-ring seal

The inside 116 of the tubes 100, 102 is evacuated by vacuum pumps (not shown), such as turbo-molecular pumps, oil diffusion pumps, or ion getter pumps. The outer surface 114 of the O-ring is exposed to atmospheric pressure, while the inner surface 113 is exposed to vacuum. As a result water will permeate from the outer volume 115 of the O-ring chamber to the evacuated inside 116.

Figure 2:
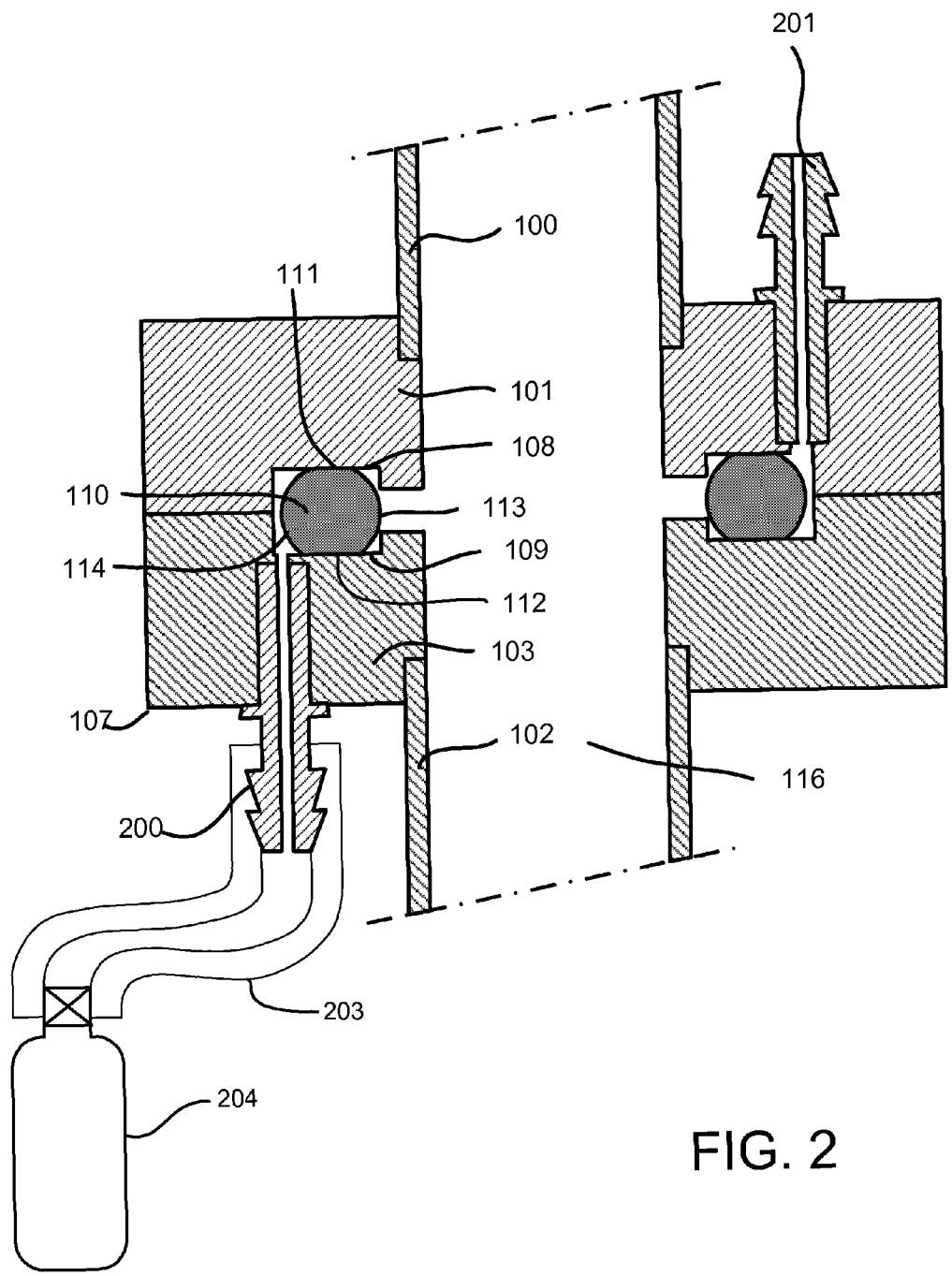
FIG. 2 schematically shows a cross-section of a seal according to the invention, FIG. 3 schematically shows a cross-section of a seal assembly according to the invention in which multiple seal assemblies are shown connected in series with a pressure regulator for controlling the flow of dry gas.
Figure 3:
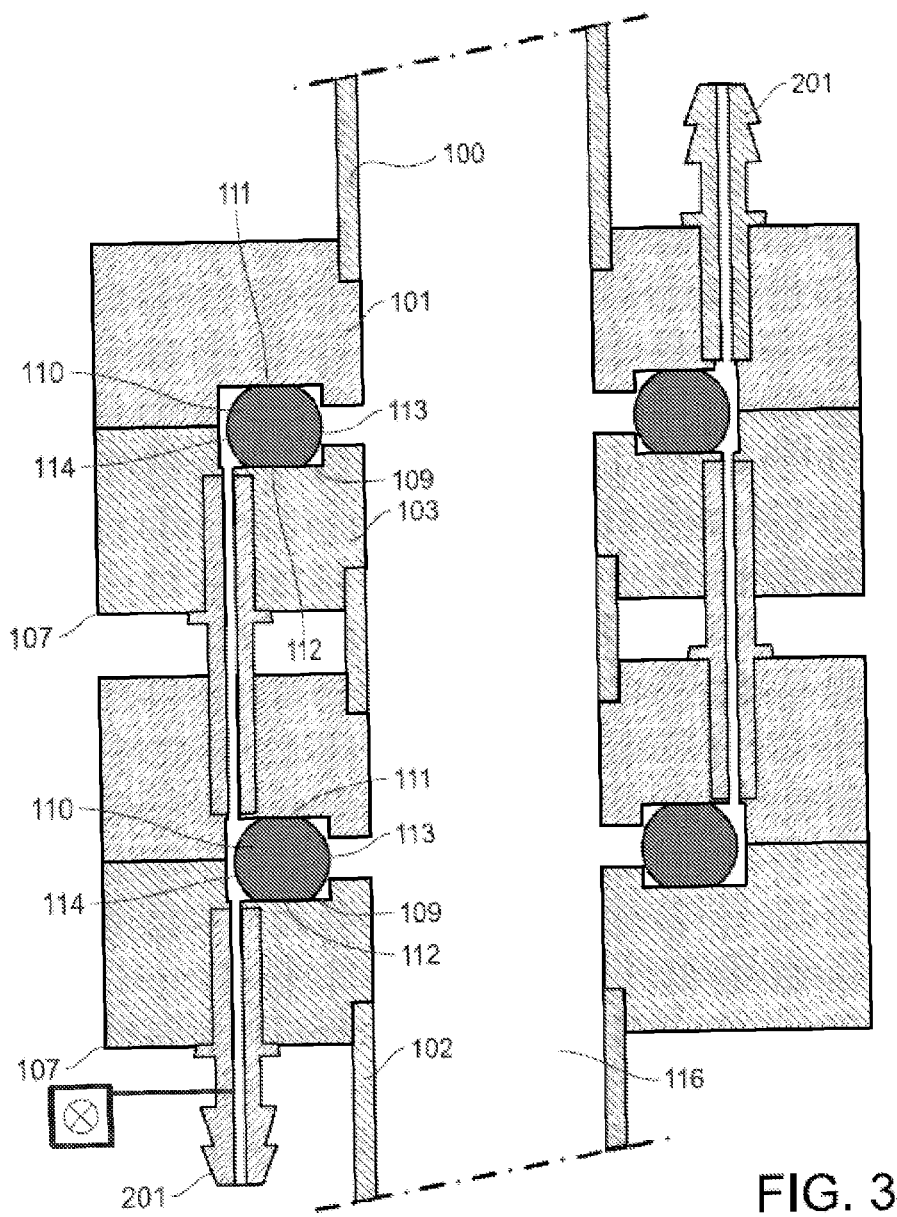

FIG. 2 schematically shows a cross-section of a seal according to the invention

FIG. 2 can be thought to be derived from FIG. 1. The flanges 101 and 103 are slightly rotated, so that bolt 104, nut 105 and rings 106 and 107 are not in the plane of the cut-through.

Flange 101 shows an inlet nipple 200 placed such that it is in contact with the outer volume 115 of the O-ring chamber, and a similar outlet nipple 201 placed in a radially opposite side of the O-ring chamber. Inlet nipple is connected via tubing 203, such as plastic tubing, to a reservoir 204 of dry gas, while the outlet nipple may connect to a volume where the gas is vented into the environment.

It is noted that, when an instrument comprises several seals according to the invention, the inlet of one seal can be connected to the outlet of another seal. By daisy-chaining the gas inlets and outlets of different seals in series, only one gas flow needs to be adjusted/regulated. Also, the total length of tubing is likely to be smaller than when feeding all inlets from one point.

By feeding a small amount of a dry gas, such as dry air or dry nitrogen, through nipple 200 into the outer volume of the O-ring chamber, the outside of the O-ring is no longer exposed to water vapour. As a result no water can permeate through the O-ring.

A small gas flow is sufficient to expel all moisture from the outer volume 115 of the O-ring chamber and the outer surface 114 of the O-ring. The gas flow can be regulated by regulating the pressure difference between the inlet and the outlet, for example using a pressure regulator. When using a pressure regulator, the conductance of the tubing connected to the inlet and the outlet, as well as the conductance of the channel, determine the gas flow.

It is noted that, when the O-ring is mounted while water is on or in the O-ring, it will take a while before the water in or on the O-ring is removed. This is a known problem, and therefore O-rings are often mildly heated before mounting, to reduce said amount of water as well as reduce, for example, the amount of plasticizers. This mild heating is also known as "baking" or "bake-out".

The inlet and the outlet define two parts in the O-ring chamber, one part from the inlet nipple clockwise to the outlet nipple and the other part form the inlet nipple counter clockwise to the outlet nipple. Preferably the inlet and the outlet nipple are mounted on opposite sides of the flanges so that the two parts of the channel have approximately equal length, and thus equal conductivity for the gas. Thereby both parts of the channel are equally flushed when dry air enters the channel. However, this is not critical and good result can be achieved when the inlet and the outlet are close to each other.

The inlet and the outlet nipple may be placed on one flange, as shown in FIG. 2, but the inlet nipple may be placed on one flange and the outlet nipple on the other.

Although in the above reference is made to round flanges and grooves only, it is well known to the person skilled in the art to use other forms, such as forms resembling a square.

It is noted that a seal can be equipped with only an inlet nipple, and that the dry gas escapes through the plane where flange 1 and flange 3 are pressed together. Also, the outlet nipple may be replaced by one or more grooves in one or both flanges, connecting the O-ring chamber with the environment.

It is further noted that, when using a gas different from dry air, such as dry $N_2$, it is recommended that the outlet is fed to a well ventilated area to avoid suffocation risks.

It is noted that the O-ring chamber may be formed by two groves, one in each flange, but that it is also possible to form a chamber with only one groove, the other flange showing, for example, a flat surface.

We claim as follows:

1. A seal assembly forming a vacuum tight seal between a first component to a second component, comprising:
    a first seal sub-assembly including:
        a first o-ring;
        a first flange attached in a vacuum tight manner to the first component, the first flange including a first groove for capturing the first o-ring, the first groove having a lip that prevents the first o-ring from extending beyond the first flange, the groove being sufficiently wide to provide space for a gas to flow between the outer surface of the first o-ring and the outer edge of the groove opposite the lip;

a second flange attached in a vacuum tight manner to the second component, the second flange including a second groove aligned with the first groove for capturing the first o-ring and having a lip preventing the first o-ring from extending beyond the second component, the first o-ring being fixed within the first and second grooves and not capable of sliding to seal against any element other than the first and second flanges;

the first flange including a first passage connecting to the first groove on the side opposite the lip to provide a flow of dry gas to the outer surface of the o-ring on the side of the o-ring opposite the lip;

the second flange including a second passage connected to the second groove on the side opposite the lip to provide an exit for the dry gas from the first passage, a second seal sub-assembly including:

a second o-ring;

a third flange attached in a vacuum tight manner to the first component, the third flange including a third groove for capturing the second o-ring, the third groove having a lip that prevents the second o-ring from extending beyond the third flange, the groove being sufficiently wide to provide space for a gas to flow between the outer surface of the second o-ring and the outer edge of the groove opposite the lip;

a fourth flange attached in a vacuum tight manner to the second component, the fourth flange including a fourth groove aligned with the third groove for capturing the second o-ring and having a lip preventing the second o-ring from extending beyond the second component, the second o-ring fixed within the third and fourth grooves;

the third flange including a third passage connecting to the third groove on the side of the second o-ring opposite the lip to provide a flow of dry gas to the o-ring surface on the side opposite the lip;

the fourth flange including a fourth passage connecting to the fourth groove on side of the second o-ring opposite from the lip to provide an exit for the dry gas from the third passage, the second passage in the second flange being connected to the third passage in the third flange, so that a dry gas can flow into the first passage in the first flange, out of the second passage of the second flange, into the third passage of the third flange and out of the fourth passage of the fourth flange.

2. The seal assembly of claim 1 further comprising a pressure regulator in series with the first passage to regulate the flow of dry gas into the seal assembly.

3. A vacuum apparatus equipped with the seal assembly in accordance with claim 1.

4. The vacuum apparatus of claim 3 in which the vacuum apparatus comprises a particle-optical apparatus.

5. The vacuum apparatus of claim 3 in which the vacuum apparatus comprises a cryogenic apparatus.

6. The vacuum apparatus of claim 3 in which the vacuum apparatus is enclosed in an enclosure, and the outlet of the fourth passage is fed to the outside of the enclosure so as to avoid suffocation risks.

* * * * *